United States Patent
Peterson, Jr.

[11] 3,762,432
[45] Oct. 2, 1973

[54] TEST PLUG
[76] Inventor: Charles D. Peterson, Jr., Richardson, Tex. 75080
[22] Filed: Mar. 29, 1971
[21] Appl. No.: 128,970

[52] U.S. Cl. .................... 137/317, 73/420, 251/145
[51] Int. Cl. ........................ B23b 41/08, F16e 41/04
[58] Field of Search .................... 137/315, 316, 317, 137/318, 223, 227; 251/145; 138/92; 141/330; 273/65 D; 73/420

[56] References Cited
UNITED STATES PATENTS

| | | | |
|---|---|---|---|
| 2,731,028 | 1/1956 | McCord | 137/223 |
| 1,974,378 | 9/1934 | Nicoll | 137/223 X |
| 2,710,623 | 6/1955 | Kolos | 137/223 |
| 3,105,613 | 10/1963 | Barton et al. | 141/330 X |
| 3,438,397 | 4/1969 | Gilpin | 137/317 X |

Primary Examiner—Martin P. Schwadron
Assistant Examiner—David R. Matthews
Attorney—Glenn K. Robbins

[57] ABSTRACT

A pressure test plug for use with high pressure systems to sense the pressure or temperature by means of a test probe. The test probe is connected either to a pressure gauge, thermometer or other sensing device and is received within a resilient core member in a pressure plug. The resilient core member is of a special probe passage construction which receives the test probe in a slit through the core passing through an intermediate valve pocket. The slit on the top side of the valve pocket is held together by the resilient nature of the core while the bottom of the valve pocket has an opening that is compressed against the probe when it is passed through it. Further sealing protection is provided by the valve pocket construction of a tapered conical configuration.

6 Claims, 4 Drawing Figures

PATENTED OCT 2 1973
3,762,432
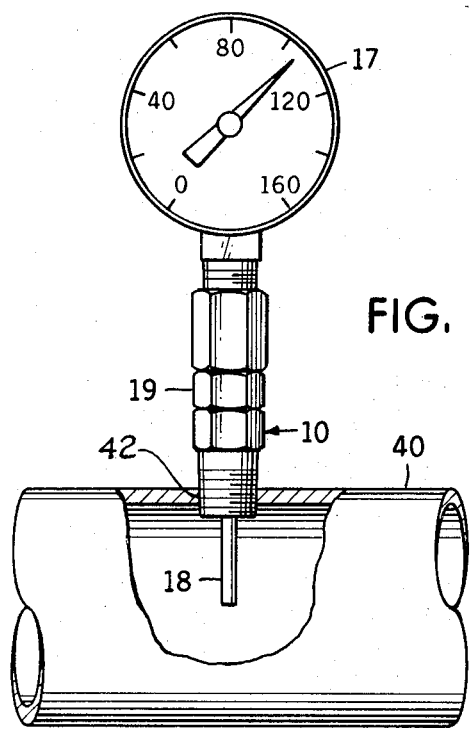
FIG. 1
FIG. 2
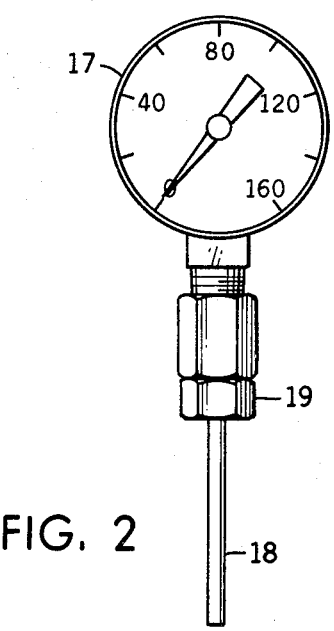
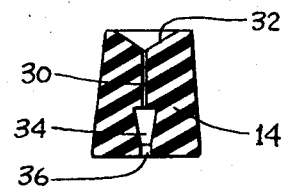
FIG. 4
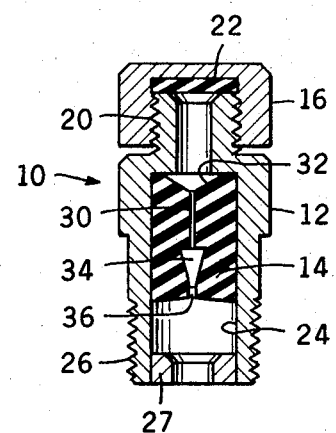
FIG. 3
INVENTOR
CHARLES D. PETERSON, JR.
BY
ROGERS, EZELL, EILERS & ROBBINS
ATTORNEYS

TEST PLUG

SUMMARY OF THE INVENTION

In the past, various resilient needle valves or plugs have been provided receiving the needle valve or probe to communicate a high pressure region with a low pressure region. The resilient valve plugs in the past have been designed to prevent leakage, but this has been a constant and recurrent problem to provide such a device that is low in cost and simple to use but at the same time is rugged.

By means of the instant invention, there has been provided a simple pressure or temperature test plug which can be tapped into a high pressure line or tank, or the like. The plug has a resilient valve core which readily receives a pressure or temperature test probe. Instead of a test probe, it will also be understood that a tubular probe may be employed to drain off fluid or even pump in fluid and the valve is designed for general use. When not in use, the valve plug can be simply capped so as to prevent tampering or any other forces that might tend to cause malfunction of the plug and pressure or fluid loss within the system to be tested.

The valve core is of frusto-conical configuration and simply seats under pressure within the housing of the pressure test plug when the core is forced into a cylindrical opening in the valve body. The core is provided with a top slit in which the sides of the slit are urged and biased toward one another by the close fit of the valve core within the plug housing. The core has a tapered or dish-shaped top so as to self-guide or selfcenter the pressure test probe into the slit. The top slit passes from the top of the core through the longitudinal axis of the valve core, to the downwardly tapered valve pocket. The valve pocket, by nature of the downward tapering nature of the construction, guides the probe into the lower opening portion of the valve core where the sides of the opening are urged against the probe and adds pressure protection and better sealing. The top slit, valve pocket and lower opening constitute a passage for the tubular probe.

The test plug, by virtue of a threaded portion at the bottom of the housing, can be readily tapped into a pressure line or container of any type for measuring pressure or temperature of various types of fluids, be they gasses or liquids. No tie-up of equipment is involved since the pressure gauge or temperature sensing device can be moved from one pressure test plug area to another, without the requirement of any permanent or semi-permanent connections. The plug is simple in construction and easy to manufacture and rugged in use, without any special training required.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that the drawings are for the purpose of illustration only and that the invention is not limited thereto.

In the drawings:

FIG. 1 is a view in elevation of a pressure line equipped with the test plug of this invention receiving a pressure gauge and probe;

FIG. 2 is a view in elevation of the pressure gauge equipped with a test probe before insertion in the test plug; and FIG. 3 is an enlarged view in longitudinal section of the test plug fitted with a cap.

FIG. 4 is a view in longitudinal section of the core before it is inserted in the housing.

DESCRIPTION OF THE INVENTION

The test plug of this invention is generally indicated by the reference numeral 10 in FIGS. 1 and 3. It is comprised of a valve body 12, a resilient valve core 14 and a protective cap 16. It is shown in use with the pressure gauge 17 in FIG. 2 connected to a tubular probe 18 adapted to be inserted through the valve core.

The valve body 12 as best shown in FIG. 3 is comprised of a metallic housing such as brass or the like for prevention of corrosion. An upper portion 20 is exteriorly threaded to receive a protective cap 16. It is in the form of a neck of reduced diameter such that the valve cap fits on the valve body with the side walls in flush engagement. A resilient seal 22 is provided in the cap to minimize any possibility of leakage, should the valve core become damaged.

The valve housing 12 has an enlarged interior opening 24 which receives the valve core. The bottom portion of the valve housing is exteriorly threaded at 26 so as to be received in a threaded tapped opening in a wall of a high pressure pipe to be sensed, or any other type of environment to be used to sense temperature or pressure, such as a liquid container, autoclave, etc. A retaining member 27 fits in the lower end of the valve housing and is spaced from the valve core a sufficient distance to provide a free area for the resilient core to expand as the probe is pushed through it and to prevent dislodgment of the valve core.

The valve core 14 is comprised of a frusto-conical body of resilient material such as neoprene, rubber, or the like. It has a longitudinal slit 30 and an opening 36 passing through the axis of the valve core to receive the needle probe 18. The slit starts at the dish-shaped top 32 which is of a concave nature to provide for self-centering of the needle probe. At the bottom portion of the slit there is a valve pocket 34 having a shoulder at the top and tapering downwardly in the general form of a downwardly pointed cone. The apex of the cone coincides with opening 36 which might be described as similar to an O-ring which is compressed to a zero inside diameter when the resilient core is forced into the valve body opening 24 from the bottom end of the valve body.

USE

The pressure plug of this invention is adapted for very simple installation and use in a high pressure line or container for liquids or pressure vessels and the like, wherever temperature is desired to be sensed, from one side of a wall to the other side. Thus, the pressure and temperature or any other environmental condition can be sensed from one side of a wall to another by the simple insertion of a tube probe 18 which senses the one side of the wall and transmits on the other side to the pressure tested plug, either to the pressure gauge, thermometer or any other type of sensing device.

Installation is effected, for example, in a high pressure conduit 40 as shown in FIG. 1 by simply tapping an opening 42 in the wall of the conduit and providing it with threads. The lower threaded end 26 of the valve housing is then simply threaded into the opening and tightened by a wrench around the hexagonal top portion of the valve housing. The pressure test plug is then ready for use. For the installation in FIG. 1 of the pressure gauge 17 the tubular probe 18 connected to the gauge is simply inserted through the neck 20 at the top of the housing and into the slit 30 in the valve core. The probe is then pushed through the valve core and the opening 36, into the interior of the conduit and this completes the installation. The pressure gauge 17 will then sense the pressure within the conduit. After the desired use of the pressure gauge or thermometer or any other type of sensing device used with the pressure plug has been completed, the device is simply removed and the cap 16 is then connected to the top of the test plug until it is desired to be used again.

The resilient valve core 14 of this invention, with the protective valve pocket 34, provides for a simple insertion of the needle probe. Thus, the pocket 34 insures against leakage through the slit opening 36 and, by virtue of the tapered walls of the pocket, a highly efficient seal has been provided when the probe is used.

Various changes and modifications may be made within this invention and will be readily apparent to those skilled in the art. Such changes and modifications are within the scope and teaching of this invention as defined by the claims appended hereto.

What is claimed is:

1. A pressure test plug comprising a rigid housing adapted to be connected through a wall from a low pressure side to a high pressure side, said housing receiving in radially compressed relation a resilient valve core having a passage for a tubular probe, said passage comprising a normally closed slit, said slit removably receiving the tubular probe from the low pressure side in sealing relation characterized in that the slit is connected with an enlarged valve pocket opening intermediate the front and the rear of the valve core and a retaining member is fitted in a lower end of the housing spaced from a lower end of the valve core to provide a free area for the valve core to expand as the probe is pushed through it.

2. The pressure test plug of claim 1 in which the valve pocket tapers from the top toward the bottom of the core contiguous with the rear portion of the slit.

3. The pressure test plug of claim 2 in which the valve pocket has a conical configuration.

4. The pressure test plug of claim 3 in which the valve pocket tapers in the conical configuration to an apex located adjacent the bottom of the plug at the high pressure side.

5. The pressure test plug of claim 2 in which the valve pocket has a shoulder forming the base of a cone and said slit communicates with the valve pocket through said shoulder.

6. The pressure test plug of claim 5 in which the valve pocket tapers in the conical configuration to an apex located adjacent the rear of the plug at the high pressure side.

* * * * *